2,693,473

VAT DYESTUFFS

Eduard Moergeli, Neuewelt, Paul Sutter, Binningen, and Walter Kern, Sissach, Switzerland, assignors to Ciba Limited, Basel, Switzerland, a Swiss firm No Drawing. Application July 17, 1950,
Serial No. 174,363

Claims priority, application Switzerland July 22, 1949

6 Claims. (Cl. 260—327)

According to this invention valuable vat dyestuffs are made by condensing at least two molecular proportions of 1-amino-5-(ortho-chlorobenzoyl)-aminoanthraquinone to form an acid amide-like compound.

The condensation to form an acid amide-like compound in accordance with this invention may be carried out in its simplest form by reacting one molecular proportion of a reactive derivative of a dicarboxylic acid, for example, an acid halide of such acid, with two molecular proportions of 1-amino-5-(ortho-chlorobenzoyl)-amino-anthraquinone. There may be used, for example, acid chlorides of aromatic dicarboxylic acids in which the carboxyl groups are bound to aromatic residues, for example, to one and the same benzene ring or to different benzene rings which are bound together by a single bond or in such manner that the benzene rings in question are condensed on to a polynuclear system, which may, if desired, also contain heterocyclic rings. Preferably the polynuclear system contains not more than four rings, such as the benzanthrone, fluoranthene, pyrene, or chrysene systems or only three rings, such as the anthracene, anthraquinone, and fluorene systems and, if desired, one of the rings may be heterocyclic and in this instance the usual atoms suitable for completing hertero-cyclic rings, such as nitrogen, sulfur, and oxygen may interconnect two benzene rings to form a polynuclear system. As such dicarboxylic acids there may be mentioned, for example, iso- or tere-phthalic acid, diphenyl-4:4'-dicarboxylic acid, naphthalene dicarboxylic acids, for example, the 2:6-dicarboxylic acid, benzanthrone dicarboxylic acids, for example, the 2:6- or Bz-1:6-dicarboxylic acid, anthraquinone-2:6- or 2:7-dicarboxylic acid, fluoranthene dicarboxylic acid or thianthrene dicarboxylic acid, and also diphenylene oxide dicarboxylic acid or diphenylene sulfide dicarboxylic acid.

Acid amide-like condensation products are also obtained by carrying out the condensation with aromatic tricarboxylic acids such as trimesic acid (benzene-1:3:5-tricarboxylic acid), advantageously in the form of a trihalide, for example, the trichloride. In this case one molecular proportion of a tricarboxylic acid trihalide may be reacted with three molecular proportions of 1-amino-5-(ortho-chlorobenzoyl) - aminoanthraquinone or with two molecular proportions of 1-amino-5-(ortho-chlorobenzoyl)-aminoanthraquinone and one molecular proportion of another amine component, such as aniline, aminodiphenyl, naphthylamine or 1-aminoanthraquinone. Cyanuric halides, for example, cyanuric chloride of the formula

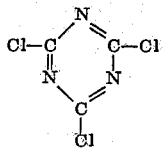

behave in a manner analogous to the tricarboxylic acid trihalides with respect to the reaction and the dyestuffs obtained. Thus, in the same manner one molecular proportion of the cyanuric halide is reacted with two or three molecular proportions of 1-amino-5-(ortho-chlorobenzoyl)-aminoanthraquinone to form an acid amide-like compound and any halogen atom remaining in the product may be brought into reaction with any desired aromatic amine, especially one containing at the most three six-membered carbon rings.

The condensation is advantageously conducted at a raised temperature in an inert high boiling solvent such as mono-, di- or trichlorobenzene, nitrobenzene or naphthalene, if desired in the presence of an acid-binding agent and/or a catalytically active agent, such as pyridine, quinoline or dimethylaniline.

The products so obtained are valuable vat dyestuffs which yield mainly yellow tints and which are in part distinguished by the strength and/or purity of their tints and in part by good to excellent properties of fastness.

The following examples illustrate the invention, the parts and percentages being by weight unless otherwise stated, and the relationship of parts by weight to parts by volume being the same as that of the kilogram to the liter:

Example 1

5.6 parts of 1-amino-5-(ortho-chlorobenzoyl)-amino-anthraquinone and 1.5 parts of terephthalic acid dichloride are heated in 120 parts of anhydrous nitrobenzene for ¼ hour at the boil. After cooling, the product is separated by filtering with suction, washed first with nitrobenzene and then benzene, and dried. A yellow-red product of the formula

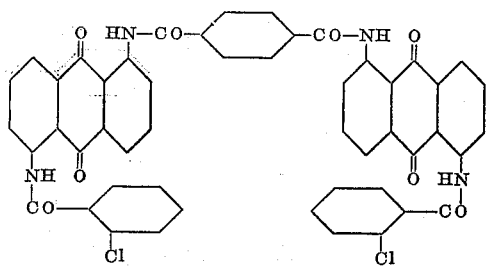

is obtained which dyes cotton fast yellow tints from a brown-violet vat.

Example 2

4.1 parts of 1-amino-5-(ortho-chlorobenzoyl)-amino-anthraquinone and 1.5 parts of diphenyl-4:4'-dicarboxylic acid dichloride are heated at the boil for ¼ hour in 120 parts of anhydrous nitrobenzene. After cooling, the product is separated by filtering with suction, washed first with nitrobenzene and then with benzene, and dried. There is obtained a yellow-red product of the formula

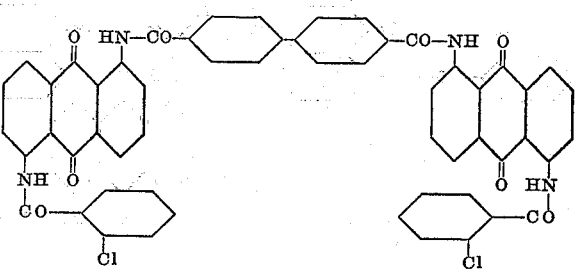

which dyes cotton fast yellow tints from a brown-violet vat.

Example 3

1.5 parts of isophthalic acid dichloride and 5.6 parts of 1-amino - 5 - (ortho-chlorobenzoyl)-amino-anthraquinone are heated at the boil for ¼ hour in 120 parts of nitrobenzene. After cooling, the product is separated by filtering with suction, washed first with nitrobenzene and then with alcohol, and dried. There is obtained a yellow-red powder which dyes cotton fast yellow tints from a brown-violet vat.

Example 4

1 part of trimesic acid chloride (benzene-1:3:5-tricarboxylic acid trichloride) and 4.2 parts of 1-amino-5-(ortho-chlorobenzoyl)-aminoanthraquinone are heated at the boil for ¼ hour in 60 parts of anhydrous nitrobenzene. After cooling, the product is separated by filtering with suction, washed first with nitrobenzene and then with alcohol, and dried. There is obtained a yellow-red powder of the formula

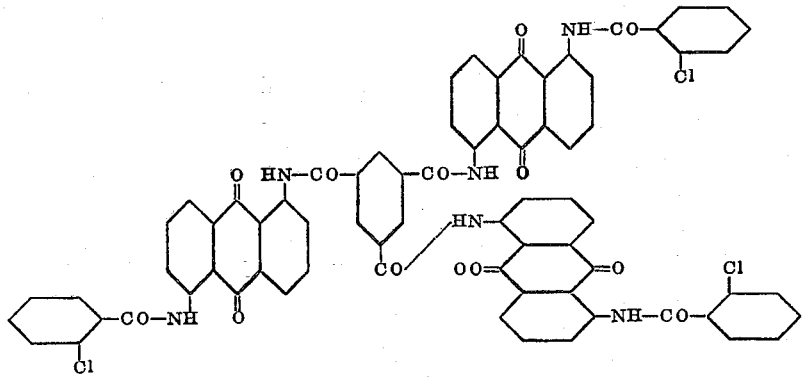

which dyes cotton from a black-violet vat yellow tints of good fastness.

*Example 5*

6.1 parts of 1-amino-5-(ortho-chlorobenzoyl)-aminoanthraquinone and 1 part of cyanuric chloride are heated at the boil for one hour in 120 parts of anhydrous nitrobenzene. After cooling, the product is separated by filtering with suction, washed with nitrobenzene and then with benzene, and dried. There is obtained a yellow-red product of the formula

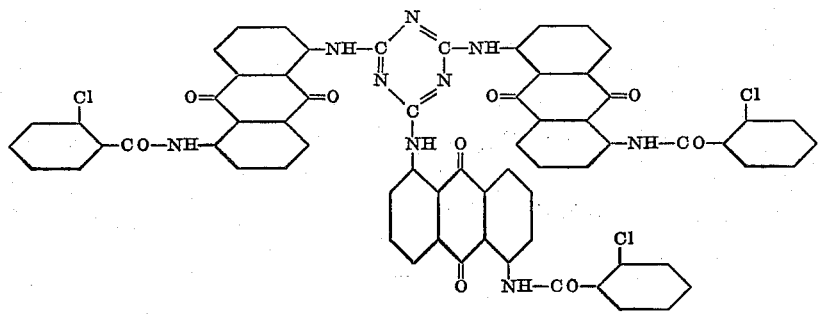

which dyes cotton fast yellow tints from a red vat.

*Example 6*

2 parts of cyanuric chloride and 8.2 parts of 1-amino-5-(ortho-chlorobenzoyl)-aminoanthraquinone are heated in 240 parts of anhydrous nitrobenzene for one hour at 180–185° C., and then heated at the boil for one hour. After the addition of 2.4 parts of 1-aminoanthraquinone the whole is boiled for a further hour. After cooling the product of the formula

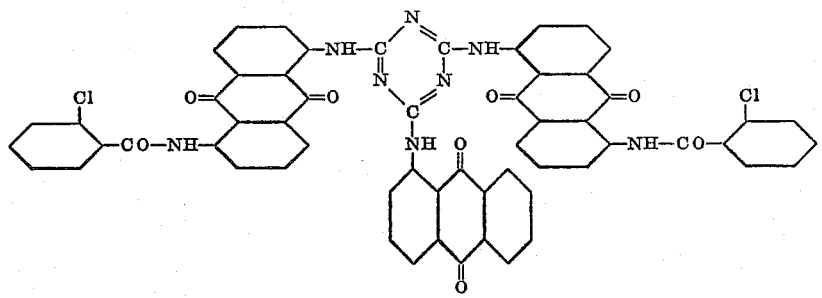

is separated by filtering with suction, washed first with nitrobenzene and then with alcohol, and dried. There is obtained a yellow-red powder which dyes cotton from a brown-red vat yellow tints of good fastness.

*Example 7*

1.5 parts of cyanuric chloride and 6.1 parts of 1-amino-5-(ortho-chlorobenzoyl)-aminoanthraquinone are heated in 240 parts of anhydrous nitrobenzene for one hour at 145–150° C., for a further hour at 155–160° C., and then for one hour longer at 165–170° C. 1 part of aniline is then added and the whole is heated at the boil for one hour. After cooling the product of the formula

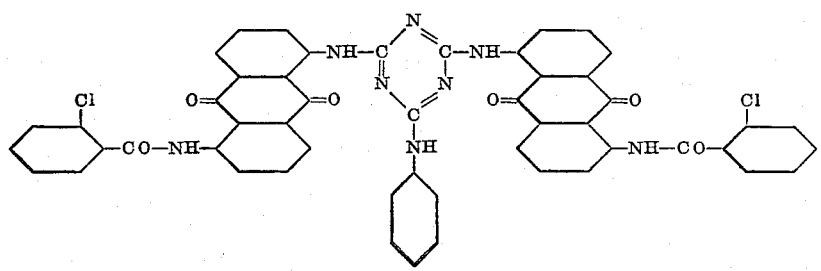

is separated by filtering with suction, washed first with nitrobenzene and then with alcohol and dried. There is obtained a red-brown powder which dyes cotton from a brown red vat yellow-red tints of good fastness.

Example 8

3 parts of thianthrene dicarboxylic acid (see U. S. Patent No. 2,338,516) and 6 parts of thionyl chloride are suspended in 120 parts of ortho-dichlorobenzene, and converted into thianthrene dicarboxylic acid dichloride by heating at 165° C. After distilling off the excess of thionyl chloride, 7.5 parts of 1-amino-5-(ortho-chlorobenzoyl)-aminoanthraquinone are added and the whole is heated at the boil for ½ hour. After cooling, the product of the formula

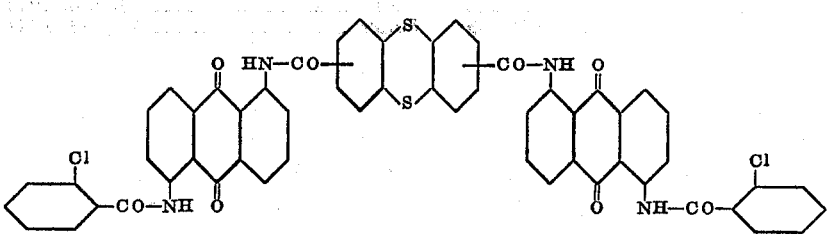

is separated by filtration, washed first with ortho-dichlorobenzene and then with alcohol, and dried. There is obtained a yellow red powder which dyes cotton fast yellow tints from a brown-violet vat.

Example 9

2 parts of fluoranthene dicarboxylic acid (see U. S. Patent No. 2,292,691) and 5 parts of thionyl chloride are suspended in 120 parts of nitrobenzene, and converted into the corresponding acid chloride by heating at 160° C. After distilling off the excess of thionyl chloride, 5.2 parts of 1-amino-5-(orthochlorobenzoyl)-aminoanthraquinone are added, and the whole is heated at the boil for ¼ hour. After cooling, the product of the formula

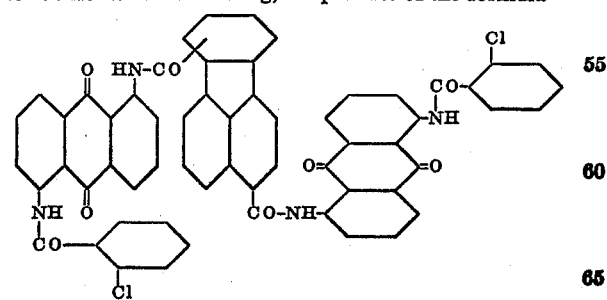

is separated by filtration, washed first with nitrobenzene and then with benzene, and dried. There is obtained a yellow-red product which dyes cotton fast yellow tints from a brown-violet vat.

Example 10

1.5 parts of the vat dyestuff obtained as described in Example 2 are vatted with 6 parts by volume of caustic soda solution of 36° Bé. and 3 parts of sodium hydrosulfite at about 50° C. in 300 parts of water. The resulting stock vat is added to a dyebath containing in 1700 parts of water 4 parts by volume of caustic soda solution of 36° Bé. and 2 parts of sodium hydrosulfite, and then 100 parts of cotton are entered into the bath at 40° C. After 15 minutes 20 parts of sodium chloride are added, and dyeing is carried on at 40–50° C. for one hour. The cotton is then squeezed, oxidized in the air, rinsed, acidified, again rinsed, and if desired, soaped at the boil. The cotton is dyed a fast yellow tint.

What we claim is:
1. A vat dyestuff of the formula

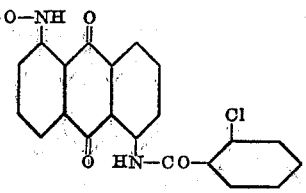

wherein —R— stands for a member selected from the group consisting of the radicals.

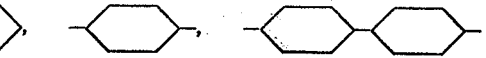

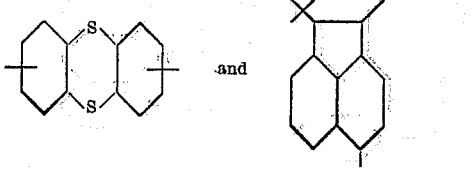

2. The vat dyestuff of the formula

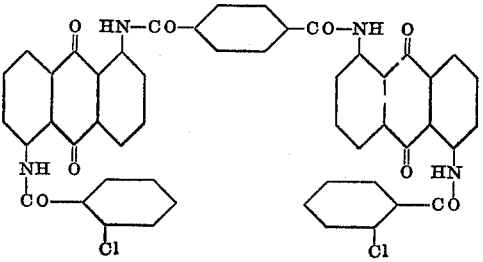

3. The vat dyestuff of the formula

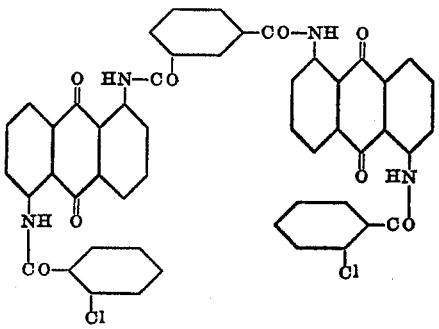

4. The vat dyestuff of the formula

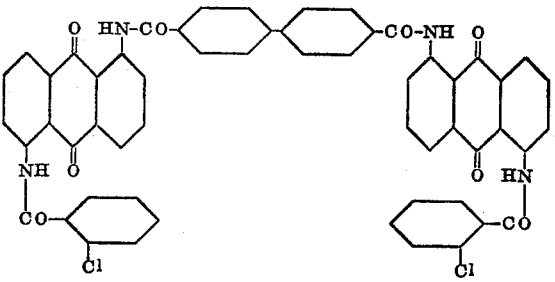

5. The vat dyestuff of the formula
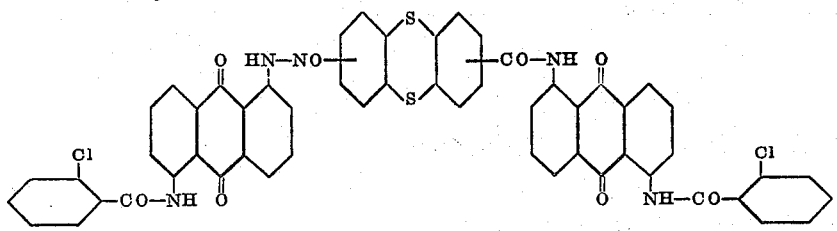
6. The vat dyestuff of the formula
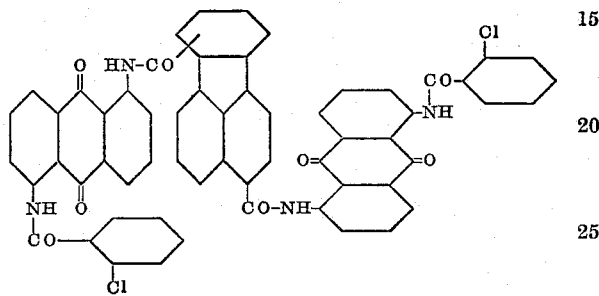
References Cited in the file of this patent
UNITED STATES PATENTS
| Number | Name | Date |
| --- | --- | --- |
| 2,338,516 | Kern | Jan. 4, 1944 |
| 2,420,453 | Sutter | May 13, 1947 |